United States Patent
Labbe et al.

(10) Patent No.: US 11,795,257 B2
(45) Date of Patent: Oct. 24, 2023

(54) INSULATION COMPOSITION

(71) Applicant: SI GROUP USA (USAA), LLC, Danbury, CT (US)

(72) Inventors: Denis Louis Emile Labbe, Sergy (FR); Christopher John Rider, Manchester (GB); Warren J. Ebenezer, Stockport (GB); Jonathan Hill, Manchester (GB)

(73) Assignee: SI Group, Inc., The Woodlands, TX (US)

( * ) Notice: Subject to any disclaimer, the term of this patent is extended or adjusted under 35 U.S.C. 154(b) by 588 days.

(21) Appl. No.: 16/638,903

(22) PCT Filed: Aug. 14, 2018

(86) PCT No.: PCT/EP2018/072060
§ 371 (c)(1),
(2) Date: Feb. 13, 2020

(87) PCT Pub. No.: WO2019/034665
PCT Pub. Date: Feb. 21, 2019

(65) Prior Publication Data
US 2020/0362081 A1    Nov. 19, 2020

(30) Foreign Application Priority Data
Aug. 18, 2017  (GB) ..................... 1713246

(51) Int. Cl.
| | | |
|---|---|---|
| *C08K 5/14* | (2006.01) | |
| *C08L 23/08* | (2006.01) | |
| *H01B 3/44* | (2006.01) | |
| *C08F 255/02* | (2006.01) | |
| *C08K 5/01* | (2006.01) | |
| *C08K 5/375* | (2006.01) | |
| *C08L 23/14* | (2006.01) | |
| *C08L 83/10* | (2006.01) | |

(52) U.S. Cl.
CPC .............. *C08F 255/02* (2013.01); *C08K 5/01* (2013.01); *C08K 5/14* (2013.01); *C08K 5/375* (2013.01); *C08L 23/083* (2013.01); *C08L 23/145* (2013.01); *C08L 83/10* (2013.01); *H01B 3/441* (2013.01); *C08L 2203/202* (2013.01)

(58) Field of Classification Search
CPC .... C08F 255/00; C08F 255/02; C08L 23/083; C08L 23/145; C08L 51/03; C08L 83/10
See application file for complete search history.

(56) References Cited

U.S. PATENT DOCUMENTS

| | | |
|---|---|---|
| 6,066,698 A | 5/2000 | Abrigo et al. |
| 6,864,323 B2 | 3/2005 | Schlosser et al. |
| 10,221,300 B2 | 3/2019 | Hagstrand et al. |
| 10,665,361 B2 | 5/2020 | Bostrom et al. |
| 2001/0020047 A1 | 9/2001 | Lau et al. |
| 2002/0039654 A1 | 4/2002 | Gustafsson et al. |
| 2004/0072950 A1 | 4/2004 | Machida et al. |
| 2005/0288434 A1 | 12/2005 | Sugiura et al. |
| 2016/0217882 A1 | 7/2016 | Bostrom et al. |
| 2016/0314869 A1 | 10/2016 | Hagstrand et al. |
| 2017/0051128 A1 | 2/2017 | Hill et al. |
| 2017/0145131 A1 | 5/2017 | Ranganathan et al. |

FOREIGN PATENT DOCUMENTS

| | | |
|---|---|---|
| AU | 2012201230 | 9/2012 |
| CN | 102682904 | 9/2012 |
| CN | 104448520 | 3/2015 |
| EP | 0824555 B1 * | 4/1999 |
| JP | H06172460 | 6/1994 |
| KR | 20120103498 | 9/2012 |
| WO | WO2009056407 | 5/2009 |

OTHER PUBLICATIONS

Maier,C. et al. Polypropylene—The Definitive User's Guide and Databook William Andrew Publishing/Plastics Design Library 1998 (Year: 1998).*
Machine translation of JPH06172460 (Year: 2023).*
International Search Report and Written Opinion for PCT/EP2018/072060 dated Nov. 9, 2018, 9 pages.

* cited by examiner

*Primary Examiner* — Irina S Zemel
*Assistant Examiner* — Jeffrey S Lenihan
(74) *Attorney, Agent, or Firm* — Dority & Manning, P.A.

(57) ABSTRACT

The present invention relates to a precursor material for an insulation composition, comprising: a crosslinkable graft polymer comprising a polyolefin component and a polyene component; and an antioxidant. The present invention also relates to an insulation composition obtained from the precursor material.

20 Claims, No Drawings

INSULATION COMPOSITION

CROSS-REFERENCE TO RELATED APPLICATIONS

This application is a 371 national-stage application of International PCT Application No. PCT/EP2018/072060, filed Aug. 14, 2018, which claims priority to United Kingdom Patent Application No. 1713246.5, filed Aug. 18, 2017, all of which are incorporated herein by reference in their entirety.

The present invention relates to insulation compositions. More particularly, but not exclusively, the present invention relates to insulation compositions which are used to insulate wires and cables.

Insulation compositions, particularly those used to insulate wires and cables, are generally formed by extruding a polymer material, for example a polyolefin such as polyethylene. During extrusion, the polymer material is crosslinked with the aid of a crosslinking agent, typically a peroxide crosslinking agent.

One problem associated with the manufacture of such insulation compositions is the premature crosslinking of the polymer, also known as scorch, which occurs during extrusion. Scorch may result in the formation of discoloured gel-like particles in the insulation composition and can lead to an undesirable build-up of pressure during extrusion. Consequently, the quality of a wire or cable insulated with the composition is diminished.

To improve the scorch resistance of insulation compositions, it is known to add one or more antioxidants. Antioxidants are also used in insulation compositions to increase the service life of an insulated wire or cable.

Known types of antioxidants for insulation compositions include phenolic antioxidants, phosphite antioxidants, sulphur-containing antioxidants, aminic antioxidants and combinations thereof.

WO 2015/078877 describes a stabilising composition which can be used to stabilise insulation compositions, such as are used for electrically insulating wires and cables. The stabilising composition comprises a first stabilising component comprising at least one fully hindered phenolic antioxidant; a second stabilising component comprising at least one partially hindered phenolic antioxidant; and a third stabilising component comprising at least one sulphur-containing antioxidant.

Another problem associated with the manufacture of insulation compositions is the production of flammable by-products, for example methane, ethane, polar alcohols and carbonyl compounds. These flammable by-products are formed when the crosslinking agent breaks down during crosslinking of the polymer material, this is particularly the case where peroxide crosslinking agents are used.

A wire or cable insulated with the insulation composition must undergo degasification for a significant amount of time and/or at elevated temperatures to remove the flammable by-products, before it is safe to use. Typically, the insulated wire or cable will be heated at a temperature of at least 60° C. under vacuum for an extended period of time, in some instances up to six months, to remove the flammable by-products.

This problem is particularly acute where the insulated wire or cable is for use in high voltage direct current (DC) applications. The wires/cables used in such applications tend to be much larger and require more insulation. Consequently, a greater volume of flammable by-products are present in the wires/cables. In addition, the insulation composition used in such wires/cables needs to have a greater purity due to the DC electricity flow. Overall, a greater degasification time is required.

Attempts have been made in the prior art to try and address this problem.

US 2016/0217882 describes a crosslinkable polymer composition, comprising: an unsaturated polyolefin having a total amount of carbon-carbon double bonds/1000 carbon atoms of at least 0.1; at least one scorch retarder; and at least one crosslinking agent. The unsaturated polyolefin is prepared by copolymerising at least one olefin monomer with at least one polyunsaturated comonomer.

US 2016/0314869 is a similar disclosure.

However, in both of the above disclosures copolymerisation to form the unsaturated polyolefin must be carried out in a separate step prior to forming the crosslinkable polymer composition, which is expensive and time-consuming. In addition, the copolymerisation requires a high temperature and/or pressure and/or an expensive catalyst system.

US 2004/0072950 discloses a polyolefin-based resin composition comprising two different polyolefins each produced from at least one monomer selected from alpha-olefins, cyclic olefins and styrenes, and a graft copolymer produced by bonding said polyolefins to each other through a polyene. This disclosure uses a polyene to bind together two polymers to form a highly complex engineered copolymer and fails to recognise any possibility of improving the scorch performance of simple polymers such as LDPE.

Similarly U.S. Pat. No. 6,066,698 discloses compositions for the polymer curing, comprising one or more organic peroxides and trans, trans-2,6-dimethyl-2,4,6-octatriene. However, this disclosure is limited to the use of a specific and highly conjugated triene in combination with organic peroxide crosslinkers as a crosslinking aid and fails to teach effective antioxidative compositions or scorch retarders.

The present invention seeks to address the above-identified problems, and provides numerous additional advantages over the prior art.

In accordance with the present invention there is provided a precursor material for an insulation composition, comprising:
  a crosslinkable graft polymer comprising a polyolefin component and a polyene component; and
  an antioxidant.

The inventors of the present invention have surprisingly found that by using a graft polymer comprising a polyolefin component and a polyene component, the amount of crosslinking agent required to form the insulation composition, particularly where the crosslinking agent is a peroxide, can be significantly reduced. Consequently, the production of flammable by-products during crosslinking of the graft polymer, is significantly reduced.

Without wishing to be bound by any such theory, it is believed that the graft polymer comprising a polyolefin component and a polyene component is more reactive with regards to crosslinking than the corresponding polyolefin per se, due to the presence of additional carbon-carbon double bonds i.e. the polyene component acts as a crosslinking accelerant. This means that less crosslinking agent is required to crosslink the graft polymer.

The reduction in flammable by-products is particularly advantageous where the insulation composition is used to insulate a wire and/or cable as it results in a significantly reduced degasification time thereof.

The graft polymer of the invention comprises a main chain formed from the polyolefin and dependent side chains formed from the polyene.

Throughout the specification, the term 'crosslinkable graft polymer comprising a polyolefin component and a polyene component' is used interchangeably with the shorthand term 'graft polymer'.

The crosslinkable graft polymer comprises a polyolefin component and a polyene component.

The polyolefin component is derived from a polyolefin and the polyene component is derived from a polyene.

The polyolefin component may form the backbone of the graft polymer, and the polyene component may form one or more side chains grafted onto the backbone.

Preferably the grafted polyene-based side chains initially have free ends—that is to say they are grafted at one of their ends to the polyolefin backbone but upon grafting are initially unattached at their opposite ends. Subsequently, crosslinking may take place between the polyolefin chains and any unreacted double bonds in the polyene side chains.

The graft polymer may be formed by free-radical grafting of the polyene onto the polyolefin. Preferably, the graft polymer is formed by free-radical grafting of the polyene onto the polyolefin by reactive extrusion.

The polyolefin may comprise polyethylene and/or polypropylene.

Preferably, the polyolefin comprises polyethylene.

The polyethylene may comprise low density polyethylene (LDPE), linear low density polyethylene (LLDPE), medium density polyethylene and/or high density polyethylene (HDPE).

Preferably, the polyethylene comprises low density polyethylene.

Additionally or alternatively, the polyolefin may comprise a copolymer of ethylene or propylene and one or more alpha-olefins or acrylates. The alpha-olefins may comprise between 3 and 12 carbon atoms, for example propylene, butene, pentene, hexene, heptene and octene. The acrylates may comprise methyl acrylate, ethyl acrylate, propyl acrylate, butyl acrylate and/or a higher alkyl acrylate. The copolymer may be a random copolymer or a block copolymer. For example, the polyolefin may comprise a block copolymer of ethylene and butyl acrylate.

The polyolefin may comprise carbon-carbon double bonds/1000 carbon atoms and/or vinyl groups/1000 carbon atoms in an amount of from about 0.1/1000 carbon atoms to about 10/1000 carbon atoms, from about 0.5/1000 carbon atoms to about 10/1000 carbon atoms, or from about 1/1000 carbon atoms to about 5/1000 carbon atoms.

Preferably the polyolefin comprises a single material selected from any of the above.

The polyene may comprise 2, 3, 4, 5, 6, 7, 8, 9, 10 or more carbon-carbon double bonds and/or vinyl groups.

The polyene may comprise a diene, for example the polyene may comprise 1,7-octadiene; 1,9-decadiene; 1,11-dodecadiene; 1,13-tetradecadiene; 7-methyl-1,6-octadiene; 9-methyl-1,8-decadiene; and/or mixtures thereof.

The polyene may comprise a triene, for example a triallyl cyanurate or isocyanurate.

Additionally or alternatively, the polyene may comprise a siloxane having the following formula:

$$CH_2=CH-[Si(CH_3)_2-O]_n-Si(CH_3)_2-CH=CH_2$$

wherein n=1 or higher

For example, the polyene may comprise a divinylsiloxane e.g. α,ω-divinylsiloxane.

Additionally or alternatively, the polyene may comprise farnesene (CAS 502-61-4); squalene (CAS 111-02-4); limonene (CAS 138-86-3, CAS 5989-27-5, CAS 5989-54-8); dicyclopentadiene (CAS 77-73-6, CAS 1755-01-7); 1,2,4-trivinylcyclohexane (CAS 2855-27-8); vinyl norbornene (CAS 3048-64-4); cyclooctadiene (CAS 111-78-4, CAS 1552-12-1, CAS 5259-71-2, CAS 17612-50-9); cyclooctatriene (CAS 1871-52-9); trans,trans,cis-1,5,9-cyclododecatriene (CAS 706-31-0); triallyl isocyanurate (1,3,5-Triallyl-1,3,5-triazinane-2,4,6-trione) (CAS 1025-15-6); triallyl cyanurate (2,4,6-Triallyloxy-1,3,5-triazine) (CAS 101-37-1); and/or mixtures thereof.

The antioxidant may comprise one or more of: phenolic antioxidants; phosphite antioxidants; sulphur-containing antioxidants; and/or aminic antioxidants.

The antioxidant may comprise a single antioxidant or a blend of two or more antioxidants.

Where the antioxidant comprises a single antioxidant, the antioxidant may have both phenolic functionality and sulphur functionality.

For example, a preferred single antioxidant may be 4,4'-thiobis (2-t-butyl-5-methylphenol) (LOWINOX™ TBM-6—CAS 96-69-5); or 4,6-bis(octylthiomethyl)-o-cresol (IRGANOX™ 1520—CAS 110553-27-0).

Alternatively, the antioxidant may comprise a blend of two or more antioxidants.

A preferred blend of antioxidants may comprise: at least one fully hindered phenolic antioxidant; at least one partially hindered phenolic antioxidant; and at least one sulphur-containing antioxidant. The blend of antioxidants may additionally comprise at least one low hindered phenolic antioxidant and/or at least one non-hindered phenolic antioxidant.

The blend of antioxidants may be selected to provide a liquid blend, for example which melts below 50° C., below 40° C., or below 30° C. Alternatively, the blend of antioxidants may be selected to provide a solid blend, for example which melts at 50° C. or higher, 60° C. or higher, or 70° C. or higher.

Such antioxidant blends are disclosed in our application WO 2015/078877, the contents of which are incorporated herein by reference.

It has been found that by selecting a tailored mixture of at least two phenolic antioxidants, one of which is fully hindered and the other of which is partially hindered in combination with a sulphur-containing antioxidant, premature crosslinking of the graft polymer during heating/extrusion is significantly reduced whilst still providing long term stabilisation, for example with respect to heat aging and crosslinking efficiency.

In addition, it has been found that such antioxidant blends exhibit reduced interaction with a crosslinking agent, which means that the antioxidant blend can be combined with a crosslinking agent and then stored prior to use without adversely impacting the efficiency of the crosslinking agent. Furthermore, reduced interaction of the antioxidant blend with a crosslinking agent facilitates crosslinking, resulting in higher torque in the crosslinked product and a faster crosslinking speed during processing.

In this context, by 'fully hindered' we preferably mean that the phenolic antioxidant comprises substituent hydrocarbyl groups on both positions ortho to the phenolic —OH group, each of those substituent groups being branched at the $C_1$ and/or $C_2$ position, preferably at the $C_1$ position, with respect to the aromatic ring.

The fully hindered phenolic antioxidant may comprise, for example, C13-C15 linear and branched alkyl esters of 3-(3'5'-di-t-butyl-4'-hydroxyphenyl) propionic acid (ANOX™ 1315—CAS 171090-93-0); octadecyl 3-(3',5'-di-t-butyl-4'-hydroxyphenyl) propionate (ANOX™ PP18—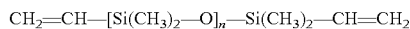CAS 2082-79-3); N,N'-hexamethylene bis[3-(3,5-di-t-butyl- 4-hydroxyphenyl)propionamide] (LOWINOX™ HD98—CAS 23128-74-7); C9-C11 linear and branched alkyl esters of 3-(3',5'-di-t-butyl-4'-hydroxyphenyl)propionic acid (NAUGARD™ PS48—CAS 125643-61-0); butylated hydroxytoluene (BHT—CAS 128-37-0); 2,6-di-tertiary-butyl-4-sec-butylphenol (ISONOX™ 132); 2,6-di-tertiary-butyl-4-nonylphenol (ISONOX™ 232); tetrakismethylene (3,5-di-t-butyl-4-hydroxyhydrocinnamate) methane (ANOX™ 20—CAS 6683-19-8); octadecyl 3-(3',5'-di-t-butyl-4'-hydroxyphenyl) propionate (ANOX™ PP18—CAS 2082-79-3); 1,3,5-tris(3,5-di-t-butyl-4-hydroxybenzyl) isocyanurate (ANOX™ IC14—CAS 27676-62-6); 1,2-bis(3,5-di-t-butyl-4-hydroxyhydrocinnamoyl)hydrazine (LOWINOX™ MD24—CAS 32687-78-8); 2,2'thiodiethylene bis[3(3,5-di-t-butyl-4-hydroxyphenyl)propionate] (ANOX™ 70—CAS 41484-35-9); 1,3,5-trimethyl-2,4,6-tris(3,5-di-t-butyl-4-hydroxybenzyl)benzene (ANOX™ 330—CAS 1709-70-2); butylated hydroxytoluene; and/or compatible mixtures of two or more thereof.

A particularly preferred fully hindered phenolic antioxidant may comprise C13-C15 linear and branched alkyl esters of 3-(3'5'-di-t-butyl-4'-hydroxyphenyl) propionic acid (ANOX™ 1315—CAS 171090-93-0).

The fully hindered phenolic antioxidant may be present in an amount of from about 15% to about 45%, from about 20% to about 40%, or from about 25% to about 35% by weight of the blend of antioxidants.

In this context, by 'partially hindered' we preferably mean that the phenolic antioxidant comprises at least one substituent hydrocarbyl group ortho to the phenolic —OH group, only one of the or each substituent group being branched at the $C_1$ and/or $C_2$ position, preferably at the $C_1$ position, with respect to the aromatic ring.

The partially hindered phenolic antioxidant may comprise, for example, 2-(1,1-dimethylethyl)-4,6-dimethyl-phenol (LOWINOX™ 624—CAS 1879-09-0); 6-tert-butyl-2-methylphenol (CAS 2219-82-1); 4,6-di-tert-butyl-2-methylphenol; 6-tert-butyl-2-methylphenol; 2-tert-butyl-4-methylphenol; 2-tert-butyl-5-methylphenol; 2,4-di-tert-butylphenol; 2,4-di-tert-pentylphenol; triethyleneglycol-bis-[3-(3-t-butyl-4-hydroxy-5-methylphenyl)propionate] (LOWINOX™ GP45—CAS 36443-68-2); 1,3,5-tris(4-t-butyl-3-hydroxyl-2,6-dimethylbenzyl)-1,3,5-triazine-2,4,6-(1H, 3H, 5H)-trione (LOWINOX™ 1790); 2,2'-ethylidenebis[4,6-di-t-butylphenol] (ANOX™ 29—CAS 35958-30-6); 2,2'methylenebis(6-t-butyl-4-methylphenol) (LOWINOX™ 22M46—CAS 119-47-1); and/or compatible mixtures of two or more thereof.

In this context, by 'low hindered' we preferably mean that the phenolic antioxidant comprises at least one substituent hydrocarbyl group ortho to the phenolic —OH group, none of those substituent groups being branched at the $C_1$ or $C_2$ position, preferably at the $C_1$ position, with respect to the aromatic ring.

The low hindered phenolic antioxidant may comprise, for example, the butylated reaction product of p-cresol and dicyclopentadiene (LOWINOX™ CPL—CAS 68610-51-5); and/or 2,6-xylenol.

In this context, by 'non-hindered' we preferably mean that the phenolic antioxidant comprises no substituent hydrocarbyl groups ortho to the phenolic —OH group.

The non-hindered phenolic antioxidant may comprise, for example, 4-tert-pentyl phenol.

The partially hindered phenolic antioxidant, optionally in combination with the low hindered phenolic antioxidant and/or the non-hindered phenolic antioxidant, may be present in an amount of from about 1% to about 40%, from about 5% to about 30%, or from about 10% to about 20% by weight of the blend of antioxidants.

The sulphur-containing antioxidant may comprise, for example, ditridecylthiodipropionate (NAUGARD™ DTDTDP (liquid) CAS—10595-72-9); 4,6-bis(octylthiomethyl)-o-cresol (IRGANOX™ 1520—CAS 110553-27-0); pentaerythritol tetrakis (β-laurylthiopropionate) (NAUGARD™ 412S—CAS 29598-76-3); dilauryl-3,3'-thiodipropionate (NAUGARD™ DLTDP—CAS 123-28-4); distearyl-3,3'-thiodipropionate (NAUGARD™ DSTDP—CAS 693-36-7); 2,2'thiodiethylene bis[3(3,5-di-t-butyl-4-hydroxyphenyl)propionate] (ANOX™ 70—CAS 41484-35-9); dimyristyl thiodipropionate (CYANOX™ MTDP—CAS 16545-54-3); distearyl-disulfide (HOSTANOX™ SE 10—CAS 2500-88-1); and/or compatible mixtures of two or more thereof.

A particularly preferred sulphur-containing antioxidant may comprise ditridecylthiodipropionate (NAUGARD™ DTDTDP (liquid) CAS—10595-72-9).

Another particularly preferred sulphur-containing antioxidant may comprise 4,6-bis(octylthiomethyl)-o-cresol (IRGANOX™ 1520—CAS 110553-27-0).

The sulphur-containing antioxidant may be present in an amount of from about 20% to about 80%, from about 30% to about 75%, from about 40% to about 70%, or from about 50% to about 60% by weight of the blend of antioxidants.

The ratio of the fully hindered phenolic antioxidant to the partially hindered phenolic antioxidant to the sulphur-containing antioxidant may be (from about 1 to about 3):(from about 0.01 to about 2):(from about 2 to about 6); or (from about 1.5 to about 2.5):(from about 0.05 to about 1.5):(from about 3 to about 5).

The precursor material may additionally comprise a crosslinking agent. In this context by 'crosslinking agent' we mean a compound capable of generating free radicals which can initiate and/or propagate a crosslinking reaction.

The crosslinking agent preferably comprises a peroxide.

The peroxide may be any peroxide known in the art for this purpose. More specifically, the peroxide may comprise dicumylperoxide (CAS 80-43-3); 2,5-dimethyl-2,5-di(tert-butylperoxy)hexane (CAS 78-63-7); tert-butylcumyl peroxide (CAS 3457-61-2); di-tert-amylperoxide (CAS 10508-09-5); 2,5-di(tert-butylperoxy)-2,5-dimethyl-3-hexyne (CAS 1068-27-5); di(tert-butyl)peroxide (CAS 110-05-4); di(tert-butylperoxy-isopropyl)benzene (CAS 2212-81-9); butyl-4,4-bis(tert-butylperoxy)valerate (CAS 995-33-5); 1,1-bis(tert-butylperoxy)-3,3,5-trimethylcyclohexane (CAS 6731-36-8); tert-butylperoxybenzoate (CAS 614-45-9); and/or dibenzoyl peroxide (CAS 94-36-0).

A particularly preferred peroxide may comprise dicumylperoxide (CAS 80-43-3).

Preferably, the peroxide has a decomposition temperature in the range of from about 100° C. to about 200° C.

When peroxides are exposed to increased temperatures, they thermally decompose to generate free radicals which can form active sites on polymer molecules. The reaction between two active sites on different polymer molecules will create a strong carbon-carbon bond between the molecules. This results in a crosslinked polymer with increased stability and/or improved mechanical properties.

A disadvantage associated with the use of peroxide crosslinking agents is the production of flammable by-products, for example methane, ethane, polar alcohols and carbonyl compounds, which are a result of the peroxide breaking down during crosslinking of the polyolefin.

However, the inventors of the present invention have surprisingly found that a reduced amount of peroxide crosslinking agent can be used when a graft polymer comprising a polyolefin component and a polyene component is used.

Without wishing to be bound by any such theory, it is believed that the graft polymer comprising a polyolefin component and a polyene component is more reactive with regards to crosslinking than the corresponding polyolefin per se, due to the presence of additional carbon-carbon double bonds i.e. the polyene acts as a crosslinking accelerant.

Consequently, the production of flammable by-products is significantly reduced during crosslinking. This is advantageous where the resulting insulation composition is used to insulate wire or cable, particularly wire or cable for high voltage DC applications, as the degasification time may be significantly reduced.

The precursor material may additionally comprise a scorch retarder. In this context by 'scorch retarder' we mean a compound which reduces the amount of premature crosslinking of the graft polymer.

The scorch retarder may be any compound known in the art for this purpose. For example, the scorch retarder may comprise 2,4-diphenyl-4-methyl-1-pentene (CAS 6362-80-7); substituted or unsubstituted diphenylethylene; quinone derivatives; hydroquinone derivatives; monofunctional vinyl containing esters and ethers; and/or mixtures thereof.

A particularly preferred scorch retarder may comprise 2,4-diphenyl-4-methyl-1-pentene (CAS 6362-80-7).

The precursor material is for an insulation composition.

In this context, by 'insulation composition' we preferably mean a composition which is capable of thermally and/or electrically insulating. The term 'insulation composition' includes semi-conductive compositions i.e. those which can be both conductive and insulative.

Also provided in accordance with the present invention is the use of a precursor material as herein described to form an insulation composition.

Also provided in accordance with the present invention is an insulation composition, comprising:
    a crosslinked graft polymer comprising a polyolefin component and a polyene
    component; and
    an antioxidant.

The insulation composition may further comprise a scorch retarder as herein described.

The insulation composition can be obtained from the precursor material as herein described.

The insulation composition can be obtained by crosslinking the crosslinkable graft polymer of the precursor material in the presence of a crosslinking agent, as herein described.

The insulation composition may be for insulating a wire or cable.

Also provided in accordance with the present invention is the use of the insulation composition as herein described to insulate a wire or cable.

Also provided in accordance with the present invention is a wire or cable comprising an electrically conductive material surrounded by the insulation composition as herein described.

The wire or cable may be for high voltage direct current applications i.e. the wire or cable may be a high voltage direct current wire or cable.

Also provided in accordance with the present invention is an electrical device or installation receiving power from the wire or cable as herein described.

Also provided in accordance with the present invention is a process for forming a precursor material, comprising:
    combining a polyolefin, a polyene and an antioxidant to form a reaction mixture; and
    heating the reaction mixture to form a crosslinkable graft polymer comprising a polyolefin component and a polyene component.

The process may comprise combining the polyene and the antioxidant to form a first mixture, and subsequently combining the first mixture with the polyolefin to form the reaction mixture.

The polyene may be present in an amount of from about 0.1% to about 3% by weight of the polyolefin. Preferably, the polyene is present in an amount of from about 0.1% to about 2% by weight of the polyolefin, or from about 0.5% to about 1.5% by weight of the polyolefin.

The antioxidant may be present in an amount of from about 0.01% to about 2% by weight of the polyolefin. Preferably, antioxidant is present in an amount of from about 0.05% to about 1% by weight of the polyolefin, or from about 0.1% to about 0.5% by weight of the polyolefin.

Unexpectedly, the inventors of the present invention have found that less antioxidant may be required to prevent scorch during crosslinking when a graft polymer comprising a polyolefin component and a polyene component is used.

The process may further comprise adding a crosslinking agent to the first mixture and/or the reaction mixture. Preferably, the crosslinking agent is added to the first mixture.

The crosslinking agent may be added in an amount of from about 0.1% to about 3% by weight of the polyolefin. Preferably, the crosslinking agent is added in an amount of from about 0.5% to about 2% by weight of the polyolefin, or from about 1% to about 1.5% by weight of the polyolefin.

The crosslinking agent preferably comprises a peroxide as herein described.

As previously outlined, an advantage of the present invention is that less peroxide crosslinking agent is required for crosslinking when a graft polymer comprising a polyolefin component and a polyene component is used.

The process may further comprise adding a scorch retarder to the first mixture and/or the reaction mixture. Preferably, the scorch retarder is added to the first mixture.

The scorch retarder may be added in an amount of from about 0.01% to about 1% by weight of the polyolefin. Preferably, the scorch retarder is added in an amount of from about 0.1% to about 1% by weight of the polyolefin, or from about 0.2% to about 0.6% by weight of the polyolefin.

The reaction mixture may be heated at a temperature of about 50° C. or more, about 60° C. or more, about 70° C. or more, about 80° C. or more, or about 90° C. or more.

Heating of the reaction mixture may be carried out as part of a compounding step and/or an extrusion step.

The graft polymer may be formed by free-radical grafting of the polyene onto the polyolefin by reactive extrusion.

Advantageously, the graft polymer can be formed under relatively mild reaction conditions, for example during compounding and/or extrusion, and without the need for an expensive reaction process and catalyst system. Thus, the graft polymer has numerous advantages over polymers formed by copolymerisation reactions, where high temperatures and/or pressures and/or expensive catalyst systems are required, for example as outlined in US 2016/0217882.

Also provided in accordance with the present invention is a process for forming an insulation composition, comprising:
    combining a polyolefin, a polyene, a crosslinking agent and an antioxidant to form a reaction mixture; and
    heating the reaction mixture to form a crosslinked graft polymer comprising a polyolefin component and a polyene component.

The process may comprise combining the polyene, the crosslinking agent and the antioxidant to form a first mixture, and subsequently combining the first mixture with the polyolefin to form the reaction mixture.

The process may further comprise adding a scorch retarder to the first mixture and/or the reaction mixture. Preferably, the scorch retarder is added to the first mixture.

The amounts of the polyene, antioxidant, crosslinking agent and scorch retarder may be the same as herein described in connection with the process for forming the precursor material.

Heating of the reaction mixture may be carried out as part of a compounding step and/or an extrusion step.

The graft polymer may be formed by free-radical grafting of the polyene onto the polyolefin by reactive extrusion.

Heating of the reaction mixture may be carried out in two stages.

The first heating stage may comprise heating the reaction mixture to a temperature sufficient to form a crosslinkable graft polymer comprising a polyolefin component and a polyene component.

For example, the first heating stage may comprise heating the reaction mixture to a temperature of 50° C. or more, 60° C. or more, 70° C. or more, 80° C. or more, or 90° C. or more.

The first heating stage may be part of a compounding step.

The second heating stage may comprise heating the reaction mixture to a temperature sufficient to form a crosslinked graft polymer comprising a polyolefin component and a polyene component.

For example, the second heating stage may comprise heating the reaction mixture to a temperature of about 100° C. or more, about 120° C. or more, about 140° C. or more, about 160° C. or more, about 180° C. or more, or about 200° C. or more.

Where the crosslinking agent comprises a peroxide, the second heating stage preferably involves heating the reaction mixture to a temperature greater than or equal to the decomposition temperature of the peroxide.

The second heating stage may be part of an extrusion step.

During the second heating stage, the crosslinkable graft polymer may continue to be formed simultaneously with crosslinking to form the crosslinked graft polymer. In other words, grafting and crosslinking may be simultaneous processes.

The majority of the crosslinkable graft polymer may be formed simultaneously with crosslinking to form the crosslinked graft polymer. However, at least some crosslinkable graft polymer is formed during the first heating stage i.e. prior to crosslinking.

Advantageously, the process for forming the insulation composition according to the present invention avoids the need for a separate copolymerisation step, which can be expensive and time-consuming. Rather, in the process for forming the insulation composition, a crosslinkable graft polymer is formed by simply combining the required constituents (a polyolefin and a polyene) and heating.

For the avoidance of doubt, all features relating to the precursor material may also apply, where appropriate, to the use of the precursor material, the insulation composition, the wire or cable, the use of the insulation composition, the process for forming the precursor material and the process for forming the insulation composition, and vice versa.

The invention is more specifically described by the following, non-limiting, examples.

EXAMPLES

Preparation of Examples 1 to 3

An antioxidant and a crosslinking agent as shown in Table 1 were combined in the appropriate ratio in a conical flask, and the mixture was warmed in a water bath at 85° C. This mixture was then added in the appropriate amount to low density polyethylene (LDPE) pellets having a density of 0.920 g/cm$^3$ and a melt flow rate of 2.0 at 190° C., 2.16 kg (manufactured by BASF-YPC Company Limited), in a rotary evaporator flask. The mixture was agitated and heated using a water bath at 85° C. until the LDPE pellets had absorbed the liquid, which took approximately 20 minutes.

Examples 1 to 3 are comparative examples.

Preparation of Examples 4 to 13

An antioxidant, polyene, scorch retarder and crosslinking agent as shown in Table 1 were combined in the appropriate ratio in a conical flask, and the mixture was warmed in a water bath at 85° C. This mixture was then added in the appropriate amount to low density polyethylene (LDPE) pellets having a density of 0.920 g/cm$^3$ and a melt flow rate of 2.0 at 190° C., 2.16 kg (manufactured by BASF-YPC Company Limited), in a rotary evaporator flask. The mixture was agitated and heated using a water bath at 85° C. until the LDPE pellets had absorbed the liquid, which took approximately 20 minutes.

Examples 4 to 13 are in accordance with the present invention.

The resulting LDPE pellets for each of examples 1 to 13 were compounded using the Farrel Twin Roll Mill at 120° C. for 2 minutes to produce calendered sheets.

TABLE 1

| | Antioxidant | | Polyene | | Scorch Retarder | | Crosslinking Agent | |
|---|---|---|---|---|---|---|---|---|
| Example | Identity | % Loading* | Identity | % Loading | Identity | % Loading | Identity | % Loading |
| 1 (Comp) | BLEND 1** | 0.24 | — | — | — | — | Dicumylperoxide | 1.8 |
| 2 (Comp) | BLEND 1 | 0.24 | — | — | — | — | Dicumylperoxide | 1.35 |
| 3 (Comp) | BLEND 1 | 0.24 | — | — | — | — | Dicumylperoxide | 1.48 |
| 4 | BLEND 1 | 0.24 | 1,2,4-trivinylcyclohexane | 1.0 | 2,4-diphenyl-4-methyl-1-pentene | 0.3 | Dicumylperoxide | 1.48 |
| 5 | BLEND 1 | 0.24 | Farnesene | 1.0 | 2,4-diphenyl-4-methyl-1-pentene | 0.3 | Dicumylperoxide | 1.48 |

TABLE 1-continued

| | Antioxidant | | Polyene | | Scorch Retarder | | Crosslinking Agent | |
|---|---|---|---|---|---|---|---|---|
| Example | Identity | % Loading* | Identity | % Loading | Identity | % Loading | Identity | % Loading |
| 6 | BLEND 1 | 0.24 | trans,trans,cis-1,5,9-cyclododecatriene | 1.0 | 2,4-diphenyl-4-methyl-1-pentene | 0.3 | Dicumylperoxide | 1.48 |
| 7 | BLEND 1 | 0.24 | 1,2,4-trivinylcyclohexane | 1.0 | 2,4-diphenyl-4-methyl-1-pentene | 0.3 | Dicumylperoxide | 1.34 |
| 8 | BLEND 1 | 0.20 | 1,2,4-trivinylcyclohexane | 1.0 | 2,4-diphenyl-4-methyl-1-pentene | 0.3 | Dicumylperoxide | 1.30 |
| 9 | BLEND 1 | 0.22 | 1,2,4-trivinylcyclohexane | 1.0 | 2,4-diphenyl-4-methyl-1-pentene | 0.3 | Dicumylperoxide | 1.30 |
| 10 | BLEND 1 | 0.22 | 1,2,4-trivinylcyclohexane | 1.0 | 2,4-diphenyl-4-methyl-1-pentene | 0.3 | Dicumylperoxide | 1.19 |
| 11 | BLEND 1 | 0.22 | 1,2,4-trivinylcyclohexane | 1.0 | 2,4-diphenyl-4-methyl-1-pentene | 0.3 | Dicumylperoxide | 1.29 |
| 12 | BLEND 1 | 0.24 | 1,2,4-trivinylcyclohexane | 1.0 | 2,4-diphenyl-4-methyl-1-pentene | 0.3 | Dicumylperoxide | 1.19 |
| 13 | BLEND 1 | 0.24 | 1,2,4-trivinylcyclohexane | 1.0 | 2,4-diphenyl-4-methyl-1-pentene | 0.3 | Dicumylperoxide | 1.29 |

*'% Loading' is the amount of the component by weight of the low density polyethylene
**BLEND 1 57 wt. % ditridecylthiodipropionate (NAUGARD™ DTDTDP (liquid) CAS-10595-72-9) 29 wt. % C13-C15 linear and branched alkyl esters of 3-(3'5'-di-t-butyl-4'-hydroxyphenyl) propionic acid (ANOX™ 1315-CAS 171090-93-0) 14 wt. % 6-tert-butyl-2-methylphenol (CAS 2219-82-1)

Moving Die Rheometer Analysis

Discs having a 35 mm diameter and 4 g weight were punched from the calendered sheets for each of examples 1 to 13. The crosslinking profile of the discs was characterised by measuring the maximum torque and the maximum crosslinking speed, using a MDR3000 Basic from MonTech™ at 180° C. and 0.5° torsion at 1.66 Hz, in accordance with standard test method ASTM D5289.

The maximum torque acts as a measure of the degree of crosslinking i.e. the polymer strength. The maximum crosslinking speed is the maximum rate of increase in crosslinking during heating.

The results are shown in Table 2.

TABLE 2

| Example | Maximum Torque (dNm) | Maximum Speed (dNm/min) |
|---|---|---|
| 1 (Comp) | 3.46 | 1.88 |
| 2 (Comp) | 2.33 | 1.32 |
| 3 (Comp) | 2.66 | 1.51 |
| 4 | 3.26 | 1.60 |
| 5 | 2.51 | 1.24 |
| 6 | 1.78 | 0.62 |
| 7 | 2.62 | 1.12 |
| 8 | 2.62 | 1.19 |
| 9 | 2.52 | 1.14 |
| 10 | 2.32 | 1.00 |
| 11 | 2.55 | 1.18 |
| 12 | 2.21 | 0.96 |
| 13 | 2.54 | 1.12 |

Comparative examples 1 to 3 clearly show that as the amount of peroxide crosslinking agent is increased, the maximum torque increases i.e. the degree of crosslinking increases, and the maximum crosslinking speed increases.

A comparison of the results for examples 3 and 4 shows that by adding a polyene to the initial mixture (which subsequently forms a graft polymer with the LDPE) in accordance with the present invention, both the maximum torque and the maximum crosslinking speed increases.

A comparison of the results for examples 3, 7, 8, 9, 10, 11, 12 and 13 shows that by adding a polyene to the initial mixture a similar crosslinking performance i.e. a similar maximum torque, can be achieved with a much lower amount of peroxide crosslinking agent. More specifically, in Example 8 the amount of peroxide crosslinking agent used is roughly 12% less than the amount used in Example 3. This is expected to result in roughly a 12% reduction in degassing time to remove flammable by-products.

The thermal aging properties of the formulations 8 to 13 were also measured. The method used was to take the calendared sheet samples described above and prepare from them crosslinked plaques of thickness 1.5 mm by compression molding at 120° C. increasing the pressure from 50 to 200 bar over 5 minutes. The cooled plaques were then transferred to a second mold and heated for a further 15 mins at 180° C. under 200 bar. The cooled plaques were then used to punch tensile bars (DIN 53-504-82) whose tensile properties were analysed before and after aging at 135° C. for 7 days and 150° C. for 10 days according to ASTM D638 using an Instron 3340 with 5 kN load cell. The results are shown table 3 and indicate an excellent aging performance.

TABLE 3

| | Initial Tensile | | Aged 7 days @135° C | | Aged 10 days @150° C. | |
|---|---|---|---|---|---|---|
| Example | Tensile Strength MPa | Elongation % | TS Retention % | Elong Retention % | TS Retention % | Elong Retention % |
| 8 | 20.9 | 665.5 | 92.8 | 98.1 | 90.6 | 95.5 |
| 9 | 20.7 | 663.3 | 95.2 | 100.2 | 94.1 | 98.1 |
| 10 | 19.2 | 645.3 | 93.7 | 94.4 | 85.3 | 88.6 |
| 11 | 19.8 | 646.4 | 89.9 | 91.7 | 86.8 | 89.3 |
| 12 | 19.4 | 655.6 | 97.9 | 97.4 | 86.6 | 86.8 |
| 13 | 20.0 | 658.9 | 91.1 | 91.3 | 90.1 | 91.7 |

The invention claimed is:

1. A precursor material for an insulation composition, comprising:
   a crosslinkable graft polymer comprising a polyolefin component that forms a backbone and a polyene component that forms one or more side chains grafted onto the backbone,
   wherein the polyene component is derived from a polyene comprising farnesene; squalene; 1,2,4-trivinylcyclohexane; cyclooctatriene; trans,trans,cis-1,5,9-cyclododecatriene; triallyl isocyanurate (1,3,5-triallyl-1,3,5-triazinane-2,4,6-trione); triallyl cyanurate (2,4,6-triallyloxy-1,3,5-triazine); or a mixture thereof; and an antioxidant.

2. The precursor material according to claim 1, wherein the polyolefin component is derived from a polyolefin comprising polyethylene and/or polypropylene.

3. The precursor material according to claim 1, wherein the polyene component is derived from 1,2,4-trivinylcyclohexane.

4. The precursor material according to claim 1, wherein the antioxidant:
  a. comprises one or more components selected from the group consisting of: phenolic antioxidants, phosphite antioxidants, sulphur-containing antioxidants, aminic antioxidants, and mixtures thereof;
  b. comprises a single antioxidant; or
  c. comprises a blend of two or more antioxidants.

5. The precursor material according to claim 4, wherein the single antioxidant has both phenolic functionality and sulphur functionality.

6. The precursor material according to claim 4, wherein the single antioxidant is 4,4'-thiobis (2-t-butyl-5-methylphenol) or 4,6-bis(octylthiomethyl)-o-cresol.

7. The precursor material according to claim 4, wherein the blend of two or more antioxidants comprises:
  i. at least one fully hindered phenolic antioxidant; at least one partially hindered phenolic antioxidant; and at least one sulphur-containing antioxidant; or
  ii. at least one low hindered phenolic antioxidant and/or at least one non-hindered phenolic antioxidant.

8. The precursor material according to claim 1, further comprising a crosslinking agent.

9. The precursor material according to claim 8, wherein the crosslinking agent is a peroxide.

10. The precursor material according to claim 9, wherein the peroxide is selected from the group consisting of dicumylperoxide; 2,5-dimethyl-2,5-di(tert-butylperoxy)hexane; tert-butylcumylperoxide; di-tert-amylperoxide; 2,5-di(tert-butylperoxy)-2,5-dimethyl-3-hexyne; di(tert-butyl)peroxide; di(tert-butylperoxy-isopropyl)benzene; butyl-4,4-bis(tert-butylperoxy)valerate; 1,1-bis(tert-butylperoxy)-3,3,5-trimethylcyclohexane; tert-butylperoxybenzoate; dibenzoyl peroxide; and combinations thereof.

11. The precursor material according to claim 1, further comprising a scorch retarder.

12. The precursor material according to claim 11, wherein the scorch retarder is 2,4-diphenyl-4-methyl-1-pentene.

13. The precursor material according to claim 1, wherein the polyene component is derived from a triene.

14. The precursor material according to claim 1, wherein the polyene component is derived from 1,2,4-trivinylcyclohexane and is present in an amount of from 0.1% to 2% by weight of the polyolefin component, wherein the antioxidant is present in an amount of 0.1% to 0.5% by weight of the polyolefin component, and wherein the precursor material further comprises a scorch retarder in an amount of 0.1% to 1% by weight of the polyolefin component.

15. An insulation composition comprising a crosslinked precursor material according to claim 1.

16. A wire or cable comprising an electrically conductive material surrounded by the insulation composition according to claim 15.

17. A process for forming an insulation composition, comprising:
  combining a polyolefin, a polyene comprising farnesene; squalene; 1,2,4-trivinylcyclohexane; cyclooctatriene; trans,trans,cis-1,5,9-cyclododecatriene; triallyl isocyanurate (1,3,5-triallyl-1,3,5-triazinane-2,4,6-trione); triallyl cyanurate (2,4,6-triallyloxy-1,3,5-triazine); or a mixture thereof, a crosslinking agent, and an antioxidant to form a reaction mixture; and
  heating the reaction mixture to form an insulation composition according to claim 15.

18. A process for forming a precursor material, comprising:
  combining a polyolefin, a polyene comprising farnesene; squalene; 1,2,4-trivinylcyclohexane; cyclooctatriene; trans,trans,cis-1,5,9-cyclododecatriene; triallyl isocyanurate (1,3,5-triallyl-1,3,5-triazinane-2,4,6-trione); triallyl cyanurate (2,4,6-triallyloxy-1,3,5-triazine); or a mixture thereof, and an antioxidant to form a reaction mixture; and
  heating the reaction mixture to form a precursor material according to claim 1.

19. A precursor material for an insulation composition, comprising:
  a crosslinkable graft polymer comprising a polyolefin component that forms a backbone and a polyene component that forms one or more side chains grafted onto the backbone, wherein the polyene component is derived from 1,2,4-trivinylcyclohexane;
  an antioxidant; and
  a scorch retarder.

20. The precursor material according to claim 19, wherein the scorch retarder comprises 2,4-diphenyl-4-methyl-1-pentene.

* * * * *